(12) United States Patent
Alcazar et al.

(10) Patent No.: US 7,552,451 B2
(45) Date of Patent: *Jun. 23, 2009

(54) PERSISTING STATE ACROSS NAVIGATIONS IN A NAVIGATION-BASED APPLICATION AND RESPONDING TO NAVIGATION-RELATED EVENTS THROUGHOUT AN APPLICATION

(75) Inventors: Mark A. Alcazar, Seattle, WA (US); Margaret Goodwin, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

This patent is subject to a terminal disclaimer.

(21) Appl. No.: 10/716,108

(22) Filed: Nov. 18, 2003

(65) Prior Publication Data

US 2004/0205782 A1  Oct. 14, 2004

Related U.S. Application Data

(63) Continuation-in-part of application No. 10/411,658, filed on Apr. 11, 2003.

(51) Int. Cl.
*G06F 9/00* (2006.01)
(52) U.S. Cl. ................... 719/328; 719/320; 717/116
(58) Field of Classification Search ............. 719/316, 719/320, 328; 717/116; 707/10
See application file for complete search history.

(56) References Cited

U.S. PATENT DOCUMENTS

| | | | | |
|---|---|---|---|---|
| 5,964,836 A | * | 10/1999 | Rowe et al. | 709/221 |
| 6,115,040 A | * | 9/2000 | Bladow et al. | 715/741 |
| 6,466,967 B2 | * | 10/2002 | Landsman et al. | 709/203 |
| 6,480,853 B1 | * | 11/2002 | Jain | 707/10 |
| 6,535,912 B1 | | 3/2003 | Anupam et al. | |
| 6,684,383 B1 | * | 1/2004 | Natori et al. | 717/107 |
| 6,691,113 B1 | | 2/2004 | Harrison et al. | |
| 6,810,395 B1 | * | 10/2004 | Bharat | 707/4 |
| 6,944,660 B2 | | 9/2005 | Eshghi et al. | |
| 7,003,550 B1 | | 2/2006 | Cleasby et al. | |
| 7,024,451 B2 | | 4/2006 | Jorgenson | |
| 7,124,355 B1 | | 10/2006 | Kukkal | |
| 2002/0103902 A1 | | 8/2002 | Nagel et al. | |
| 2002/0120940 A1 | | 8/2002 | Willard | |

OTHER PUBLICATIONS

Netscape, "Persistent Client State HTTP Cookies", 1999, pp. 1-5.*

* cited by examiner

*Primary Examiner*—Li B Zhen
*Assistant Examiner*—Phuong N Hoang
(74) *Attorney, Agent, or Firm*—Lee & Hayes, PLLC

(57) ABSTRACT

Described is a mechanism for persisting state across navigations in a navigation-based application so that the state is accessible by each resource of a app. The invention provides an object (a "NavigationApplication object") that persists across navigations. The NavigationApplication object allows developers to directly persist state by setting properties on that object and to trap navigation events. Enabling run-time state to be persisted in object form on the client not only improves performance, but makes it possible to develop navigation-based applications that can be run either online or offline. The NavigationApplication object makes it easier to persist state on the client across navigations.

22 Claims, 6 Drawing Sheets

PERSISTING STATE ACROSS NAVIGATIONS IN A NAVIGATION-BASED APPLICATION AND RESPONDING TO NAVIGATION-RELATED EVENTS THROUGHOUT AN APPLICATION

This application is a Continuation-in-Part of application Ser. No. 10/411,658 filed Apr. 11, 2003, which is hereby expressly incorporated by reference for all purposes.

FIELD OF THE INVENTION

The present invention relates to navigation-based software applications, and more particularly, to preserving state across navigations in a navigation-based software application, and to listening to navigation-related events throughout the application in a single place.

BACKGROUND OF THE INVENTION

The term "Web application" or "Web app" is often used to describe a new type of software application that is commonly deployed as multiple Web pages accessible over the Internet. A conventional Web app includes multiple Web pages representing markup-based documents. The Web app may also include scripts or other resources that are accessed through the Web pages. Commonly, the Web app is stored on a Web server and downloaded to a local computer when being used. Currently, it is not actually possible to download and install a typical Web app for subsequent use when the computer is offline.

For most Web apps, the multiple Web pages and resources are hyperlinked together in such a way that the "business logic" of the Web app is distributed over the multiple resources. Each page is responsible for a portion of the overall business logic, and by navigating from page to page, the user can experience the entire Web app. For the purpose of this document, the term "navigating" refers to causing a hosting environment to retrieve a resource associated with the Web app, such as by activating a hyperlink. Navigating to a resource typically involves navigating away from another resource where the navigated-to resource is the one being retrieved by the hosting environment.

Current technological limitations make conventional Web apps less than optimum. For instance, there is no communication between the Web pages or resources. With the conventional Web app, state information can only be persisted when navigating from one Web page to another by using "cookies" or a server-side session object, neither of which is particularly satisfying.

If a server-side session object or server-side cookie is used, the session state lives on the server. For that reason, a round-trip to the server is required if a Web page that is loading on a client machine needs access to the session state. Not only is this not optimal for performance, it precludes using these Web apps when offline.

Client-side cookies may also be used to share state between navigations. However, there are a number of problems with this approach as well. For instance, cookies are text based, which greatly limits their effectiveness. Cookies cannot be used to store objects as objects. Rather, an object must be persisted and de-persisted as text if a cookie is used. This poses a particular problem because current architectures limit the size of cookies to 4 kb per cookie. In addition, there is a maximum of 20 cookies per Web-page. So the amount and kind of information that can be stored in a cookie is severely limited. Further still, users frequently disable local cookies, which renders cookie-based applications ineffective.

A superior mechanism for persisting state between navigations in a navigation-based application, such as a Web app, has eluded those skilled in the art.

SUMMARY OF THE INVENTION

The present invention is directed at persisting state across navigations so that state is accessible by each resource of a navigation-based application. Briefly stated, the invention provides an object (a "NavigationApplication object") that persists across navigations. The NavigationApplication object exists for the duration of one session of the navigation-based application and is accessible by each of the application's resources. Properties of the NavigationApplication object are used by those resources to store and retrieve state information. The resources can be designed to take advantage of the NavigationApplication object to persist state. State information set by one resource is directly available to another resource to which a user may navigate during the life of the application. The state information is stored in object form and there are no rigid limitations on how much information can be stored in the NavigationApplication object, thereby removing the common issues associated with existing state-persistence mechanisms.

Enabling run-time state to be persisted in object form on the client not only improves performance, but makes it possible to develop rich Navigation-based applications that can be run either online or offline.

In another aspect of the invention, the NavigationApplication object includes events that notify interested resources of navigation-related occurrences. The NavigationApplication object allows resources to trap those navigation events.

By providing a client-side object, state and business logic is more easily stored on the client machine, performance is improved by reducing server round-trips, a more consistent end-user experience is provided online and offline, and it is easier for developers to develop rich connected applications. By providing the developer with navigation events, the object gives Navigation-based application authors a high degree of control over application flow, something previously unavailable in Navigation-based applications.

DETAILED DESCRIPTION OF THE PREFERRED EMBODIMENT

The invention provides a mechanism that enables state to be persisted across navigations in a navigation-based application. As used in this document, the term "navigation-based application" will refer to an application that allows a user to interact with resources of the application by navigating from one resource associated with the application to another. The conventional Web app falls within the category of navigation-based applications. In addition, the present invention enables navigation-based applications with functionality beyond the conventional Web app, as will become clear from the following discussion.

Briefly described, a NavigationApplication object is used as the entry point to the navigation-based application. The NavigationApplication object is created when the navigation-based application is launched, and includes methods, properties, and events to support the navigation-based application while executing. In particular, a property collection may be provided in the NavigationApplication object that enables resources of the navigation-based application to store and retrieve state information. These properties are accessible to each resource of the application, thus enabling state persistence and sharing of state across navigations.

The invention will be described here first with reference to one example of an illustrative computing environment in which embodiments of the invention can be implemented. Next, a detailed example of one specific implementation of the invention, including certain key components, will be described. Alternative implementations may also be included with respect to certain details of the specific implementation. It will be appreciated that embodiments of the invention are not limited to those described here.

Illustrative Computing Environment of the Invention

Figure 1:
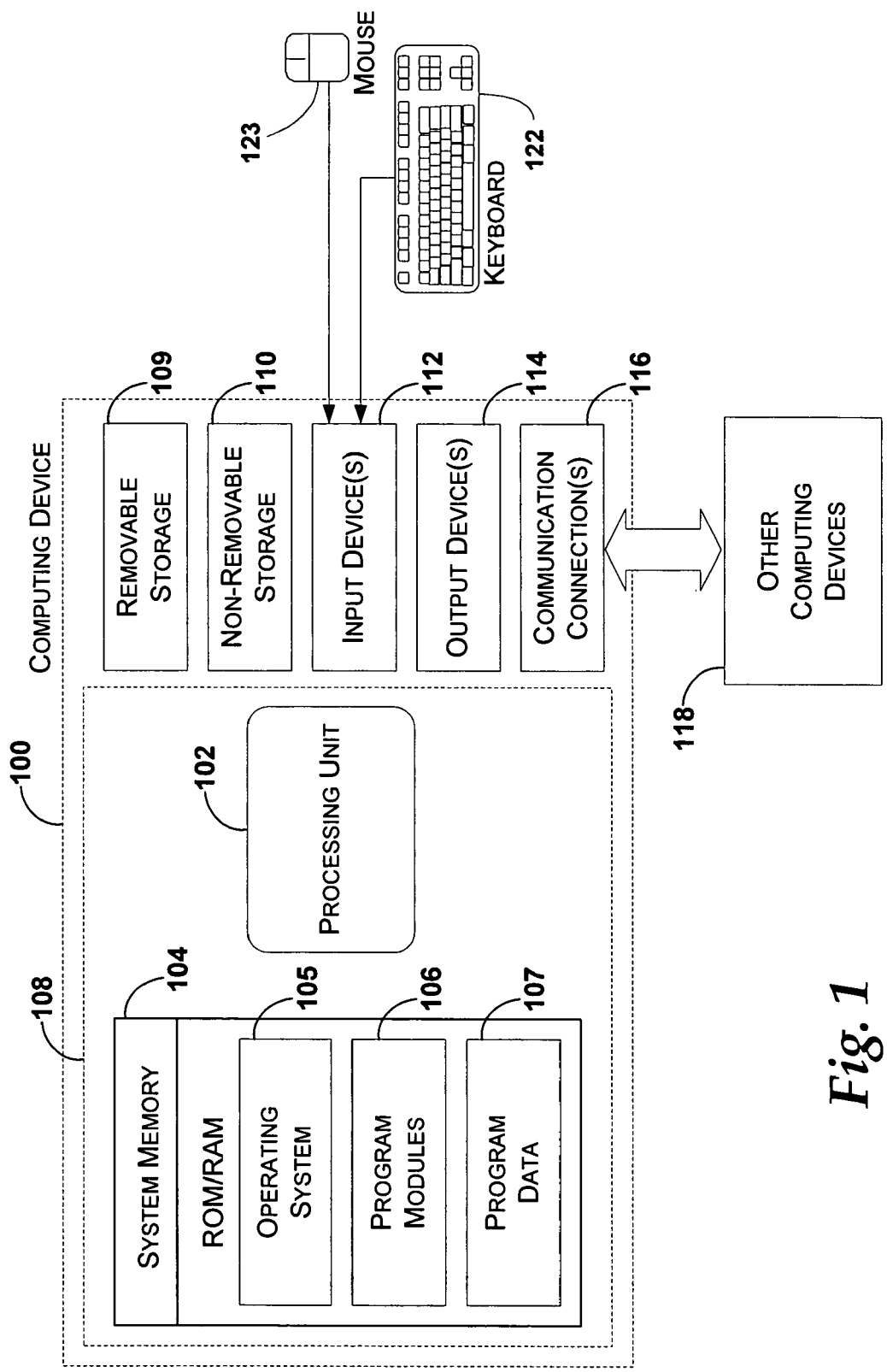
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation of the Invention

Figure 2:
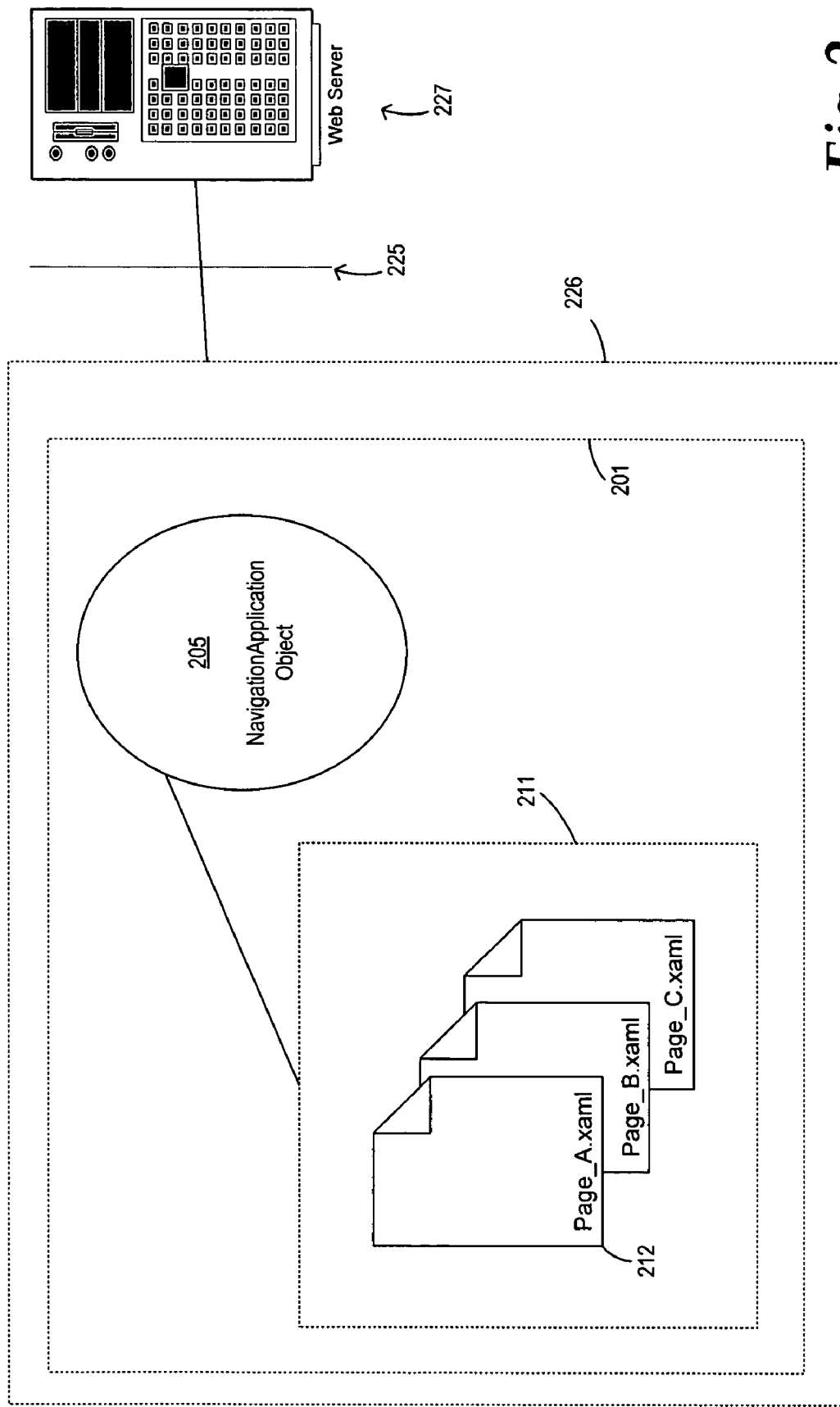
FIG. 2 is a functional block diagram generally illustrating components of one system implementing the present invention.

FIG. 2 is a functional block diagram generally illustrating components of one system implementing the present invention. Illustrated in FIG. 2 is a local client computer 226 and a navigation-based application ("App") 201 connected to a Web server 227 over a network 225, such as a local or wide area network or the Internet. The App 201 is similar to conventional navigation-based applications in that it includes a group of resources 211 that are linked together such that a user may navigate from one resource to another. The resources 211 are typically Web pages, such as Page_A 212, but may also include other resources, such as code, images, or the like. The resources may be expressed in declarative languages using XML, or traditional web-based languages such as HTML. The resources may also be code-based, such as may be written in an interpreted language or the like. The resources 211 may be downloaded over the network 225 from the Web server 227 or may be installed on the local computer.

However, as will be described in much greater detail, unlike conventional Web-based applications, any resource within the application may preserve state in memory through the use of a NavigationApplication object 205. The NavigationApplication object 205 is described in detail in conjunction with FIG. 4. However, briefly stated, the App 201 is hosted in some sort of execution environment in which the resources 211 are interpreted or executed. The execution environment may be Web browsing software or other execution environments, such as that provided for standalone applications by the operating system. The NavigationApplication object 205 serves as the entry point of the App 201 and is used to define characteristics and parameters of the App 201. In other words, unlike conventional Web-based applications, a reference to the NavigationApplication object 205 is used to launch the App 201 in the execution environment rather than simply a reference to a navigation page. The NavigationApplication object 205 may derive from an Application object (see FIG. 6) and includes mechanisms (e.g., methods and properties) for storing and retrieving the state of the App 201 by the resources 211.

In traditional Web applications, the business logic of the application must be distributed among its resources, and if some piece of logic is shared by multiple resources, the script must be copied into each resource that uses it. In contrast, the invention makes it possible to centralize shared business logic in the NavigationApplication object 205, so it doesn't have to be duplicated on every page that uses it.

Generally stated, the App 201 is executed by launching (e.g., double-clicking, following a hyperlink to, or otherwise activating) a reference to the NavigationApplication object 205. The execution environment initializes the application based on information stored in the NavigationApplication object 205. Then the starting page or resource of the NavigationApplication object 205 is presented to the user. As the application executes and performs is appointed tasks, state may be stored in or retrieved from the NavigationApplication object 205 by the resources 211. Any of the resources 211 that need or desire state information about the application include instructions that access the NavigationApplication object 205 for that state information. This differs from conventional navigation-based applications which do not persist state for use by resources across navigations.

It should be noted that there are basically two kinds of application state. One type of application state is defined by the NavigationApplication class, of which the NavigationApplication object 205 is an instance. And the other type of state is the state defined by an application developer and stored by the resources of the application in the NavigationApplication object 205. The latter type of state is being referred to here.

Specific Components of the Illustrative Implementation

The principal components that enable state persistence in this implementation of the invention is the NavigationApplication object 205 which derives from an Application class. Those two components will now be described in detail as they pertain to this particular implementation of the invention. Those skilled in the art will appreciate that the components described in detail here are illustrative only and alternative components will become readily apparent to those skilled in the art based on the teachings provided here.

Figure 6:
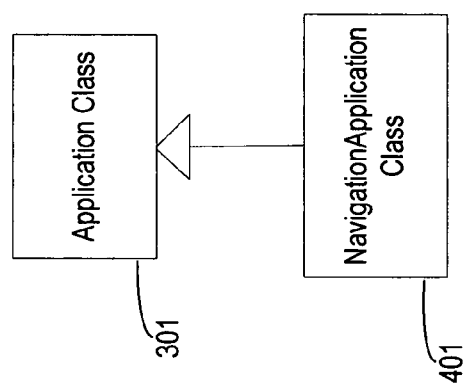
FIG. 6 is a functional block diagram generally illustrating a relationship between a NavigationApplication class and an Application class, in accordance with one implementation of the invention.

Turning briefly to FIG. 6, as eluded to earlier, a NavigationApplication class 401 is derived from an Application class 301. Accordingly, certain functionality available in the NavigationApplication object 205 may be attributable to either the Application class 301 or the NavigationApplication class 401. For the sake of completeness, each class relative functionality will be described in detail here.

Base Application Class

Returning now to FIG. 3, the NavigationApplication object 205 is an instance of a NavigationApplication class 401, which is derived from the Application class 301. The NavigationApplication object 205 is instantiated to represent a particular application session. In other words, the NavigationApplication object 205 is instantiated as a result of launching a particular instance of the NavigationApplication class 401. The NavigationApplication object 205 can be accessed from any resource (e.g., a page or object) directly associated with the application while that instance of the application is executing.

Figure 3:
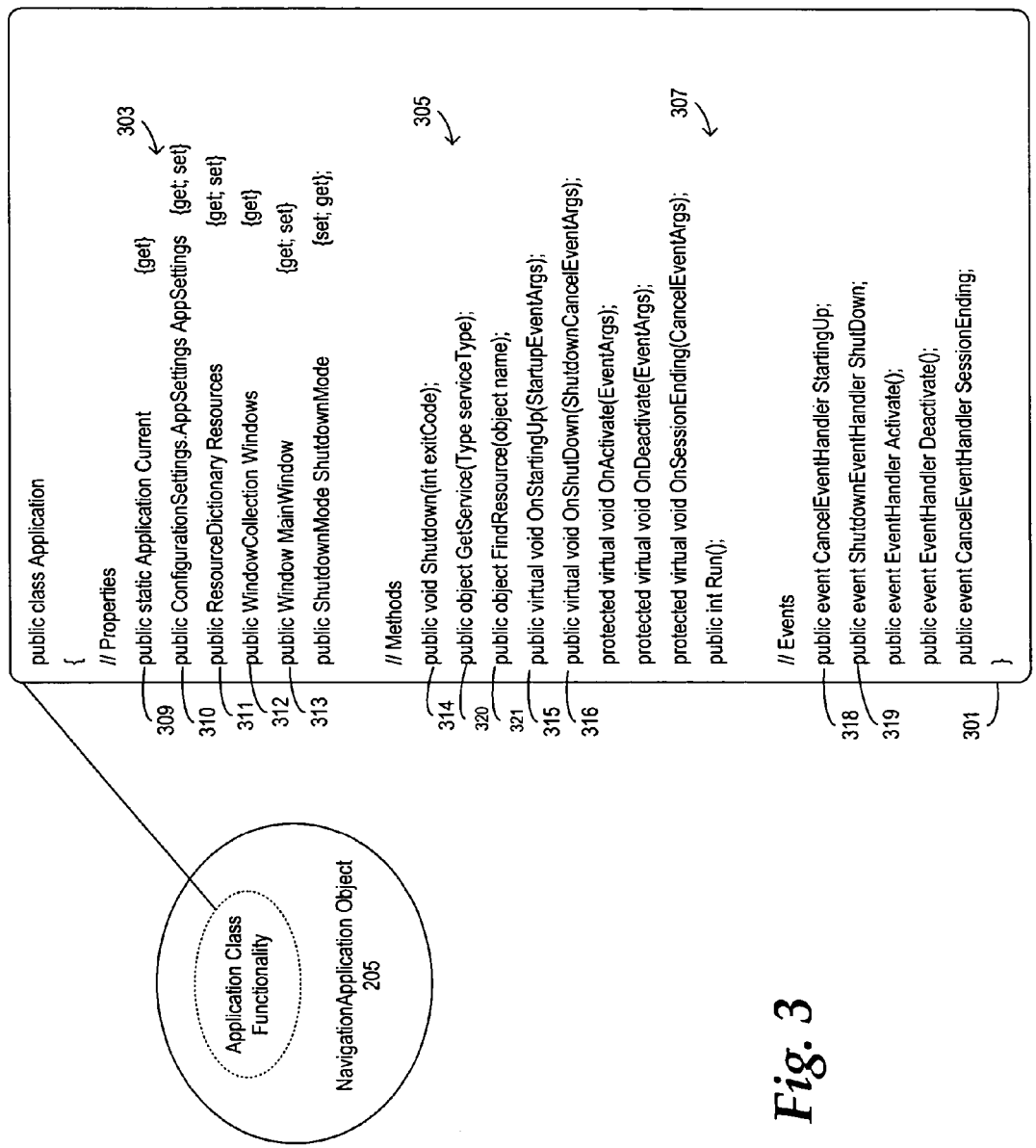
FIG. 3 is a graphical representation of an application object that may be used as an entry point into and to represent a navigation based application, in accordance with one implementation of the present invention.

FIG. 3 illustrates the functionality of the NavigationApplication object 205 that is attributable to the base application class 301. The application class 301 includes a number of properties 303, methods 305, and events 307. A representative few of those are shown in FIG. 3. The NavigationApplication object 205 is created using a constructor, and a static Current property 309 allows that instance of the NavigationApplication object 205 to be accessed throughout the application.

The application class 301 also includes a Resources property 311, which enables a developer to specify resources, including styles and properties, that apply to all pages within the application's extent. Because the NavigationApplication object 205 persists for the lifetime of the application, it is possible to set styles on the NavigationApplication object 205 that apply to pages belonging to the application. This is a significant convenience for developers who want to apply a consistent look and feel across their application, or for applying themes or accessibility features.

The application class 301 also includes a window collection 312. When a new window is created by the executing application, the new window adds itself to the window collection property 312 of the Application object 301. The application shuts down when the last window is closed (e.g., when the window collection property 312 of the Application object is empty). In this particular implementation, if the application is hosted in a browser, the browser window is not closed when the application is shut down. If the user navigates to a resource outside the extent of the current application, the application shuts down. However, if a browser-hosted application has one or more secondary windows open at the time the user navigates away, the application does not shut down until the secondary windows are closed. This feature could be configurable by the developer, so the developer could decide whether the application shuts down when the last window is closed, or whether the application shuts down when the main window is closed, thereby shutting down any other windows that remain open. The MainWindow property 313 identifies the window that the Application object opened by default.

The Application class 301 may also have an AppSettings property 310, which contains settings that can be configured at runtime and persisted across invocations of the application, so the user doesn't have to reenter them. The AppSettings property 310 can be used to configure standard or application-specific settings. These are persisted so the user only has to set them once, rather than every time they return to the application.

The application class 301 includes a Shutdown method 314, which can be invoked to programmatically shut down the application.

The application class 301 also includes an OnStartingUp method 315 and an OnShutDown method 316, among others. Those two methods can be overridden to alter the startup and shutdown behavior of the application without adding event handlers when subclassing the application class 301. The OnActivate/OnDeactivate methods in combination with the Activate/Deactivate events allow control over operation when a window belonging to another application is being activated, or when a window belonging to the application is being activated.

The GetService method 320 can be used to obtain a service that extends the capabilities of the Application, but isn't common to all applications (e.g., to add Rights Management protection or take advantage of browser-specific features when hosted in the browser).

The FindResource method 321 can be used to locate a resource in any part of the application.

The several events 307 of the application class 301 include a StartingUp event 318 and a ShutDown event 319. The application developer can attach a handler to the StartingUp event 318 to initialize the application or open a new window and present the user with some user interface. A handler for the ShutDown event 319 could be used to check whether any unsaved state exists, to persist the state, or to do any other cleanup tasks that may be useful or required when the application is shut down. For instance, those two events could be used in conjunction to persist state on shutdown and to restore it on startup. This technique may be used to create the impression that the application's state remains just as it was when the user left it.

Navigation Application Class

Figure 4:
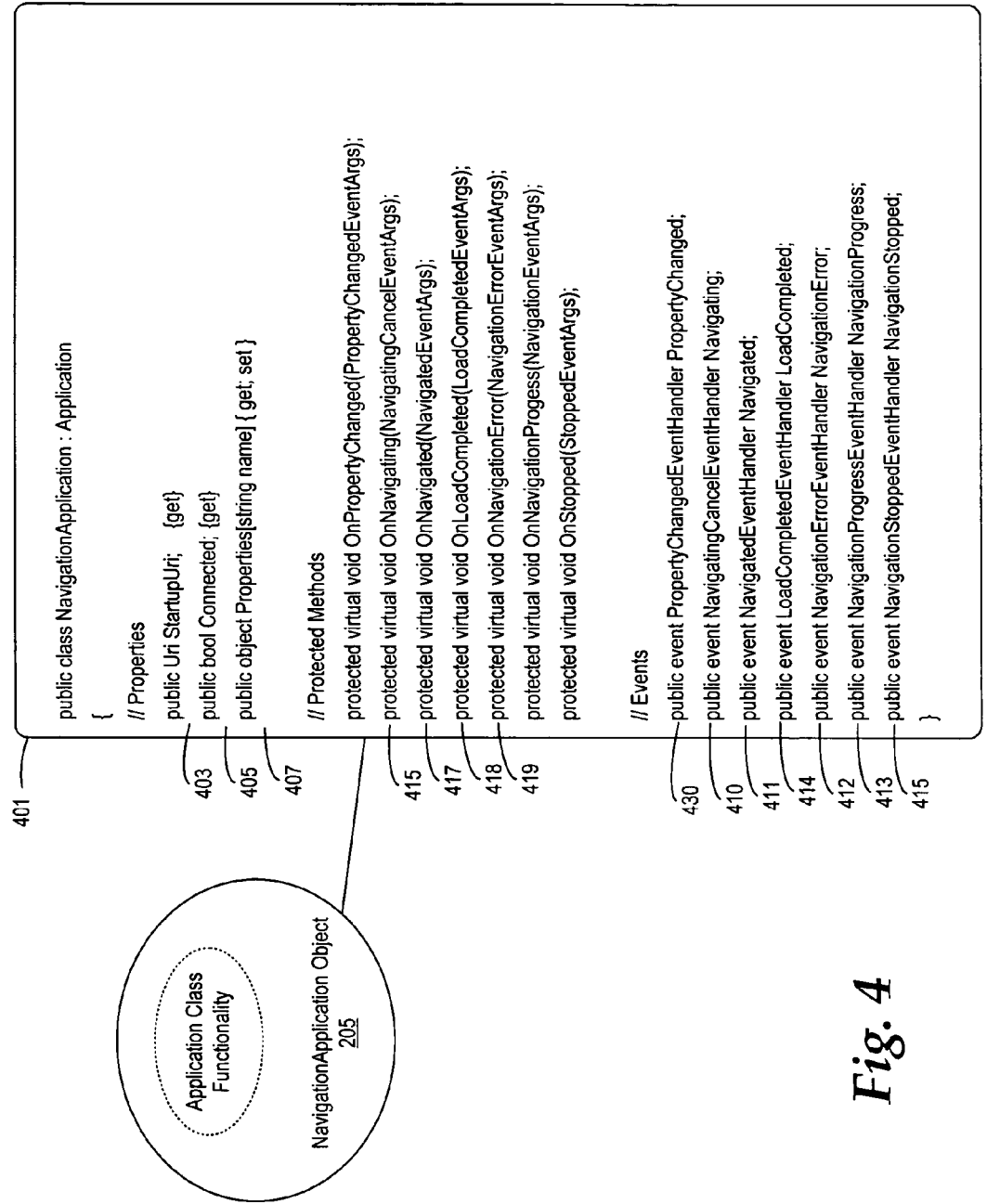
FIG. 4 is a graphical representation of a NavigationApplication object that may be used in a navigation based application to persist state information across navigations, in accordance with one implementation of the present invention.

Referring now to FIG. 4, the NavigationApplication object 205 includes functionality added to the Application class 301 by the NavigationApplication class 401. Because the NavigationApplication class 401 is derived from the Application class 301, it provides all the properties, methods, and events of the Application class 301, and, additionally, provides extra properties, methods, and events specific to navigation-based applications. The NavigationApplication class 401 adds properties, methods, and events specific to a navigation-based (Web-app style) application. If an application developer is writing a navigation-based application, he would typically specify the NavigationApplication class 401, rather than the Application class 301, as his application class.

Most importantly, the NavigationApplication class 401 includes a Properties collection property 407 that provides storage for resources 211 of the application to store state information. Resources may set state information in the Properties collection property 407, as described below, to make that information available to other resources. Making state information available in object form, as with the Properties collection property 407, has not been possible with prior navigation-based application mechanisms. Any resource in the application can add properties to the Properties collection property 407, as well as set a value on it. After a resource has added a property, any other resource can access or change its value. This is how pages share state among themselves.

A StartupUri property 403 specifies a page to which the application will navigate when it is launched. The NavigationApplication class 401 may also include a Connected property 405 that can be queried to determine whether the computer is on line at any given time.

Several navigation-related events are also provided in the NavigationApplication class 401. For instance, a Navigating event 410 is raised when a navigation has been initiated, but before the navigation takes place. This event informs the application and any resources belonging to it of the occurrence of a navigation. This event conveys information about the window or frame that's navigating, the URL of the resource that's being navigated to, and whether the navigation is a new navigation, a travelog navigation (the user clicked Forward or Back), or because the user is refreshing the current page. One possible use of the Navigating event 410 could be to store data entered by the user on the current page in the Properties collection 407 on the NavigationApplication object 205, so that it can be accessed by other resources after the current page is gone. The Navigating event 410 may be cancelled, which prevents the navigation from taking place. A Navigated event 411 is provided to notify resources that the navigation is complete. The Navigated event 411 is informational and cannot be cancelled.

After the navigation is complete, the resource still needs to download from a URL (or load from the local machine), so there is also a LoadCompleted event 414 that can be used to determine when the resource has finished loading.

A NavigationError event 412 is raised if an error occurs during the navigation or download. This event may be cancelled, which prevents a default error message from being displayed to the user. A handler for this event might redirect to a custom error page or present a custom error message.

The NavigationProgress event 413 is raised periodically during the navigation and download to provide information on how many total bytes need to be downloaded and how many have been downloaded at that particular instant. This enables the developer to show a progress indicator to the user.

In the event that the user cancels a navigation by clicking the Stop button in the browser, the NavigationStopped 415 event is raised.

A resource that wants to be notified of a navigation-related event may register a method as an event handler for that event with the NavigationApplication object. The NavigationApplication object then calls the event handler whenever that event takes place in any window or frame belonging to the application. For instance, a developer may include code in the handler for the Navigating event to perform any desired action before allowing the navigation to occur, and/or can cancel the navigation. One possible action a developer might perform in the Navigating event could be to store data entered by the user on the current page in the Properties collection 407 on the NavigationApplication object 205, so that it can be accessed by other resources after the current page is gone. A developer might use the Navigated event handler to perform any action the application developer wants to perform after a new resource is loaded.

For every event, there is a corresponding protected virtual method that is called whenever the event is raised. These methods are is provided as a convenience for developers who are deriving from the NavigationApplication class. A developer deriving from the NavigationApplication class could override the corresponding method instead of attaching an event handler to the event. For example, the Navigating event 410 has a corresponding OnNavigating method 415, and the Navigated event 411 has a corresponding OnNavigated method 417.

In short, when a navigation is about to take place in a window or frame belonging to the application, the Navigating event 410 is fired and the OnNavigating method 415 is called. After a navigation is completed, the Navigated event 411 is fired and the OnNavigated method 417 is called. After the resource has finished being loaded into memory and parsed, the LoadCompleted event is raised and the OnLoadCompleted method is called. If a navigation cannot be completed, the NavigationError event 412 is fired and the OnNavigationError method 419 is called. The application developer can attach a handler to the NavigationApplication object 205 for any or all of these events, or, if deriving from the NavigationApplication class, can override the corresponding virtual method. The Navigating event is cancelable, so the developer can completely override navigation behavior if desired. Events are also fired on Stop and Refresh.

The NavigationApplication class 401 of this embodiment additionally may also include an interface. A further refinement of this embodiment may allow databinding to any property on the NavigationApplication object from content on the page, not just the properties in the properties collection.

Generalized Operation of the Illustrative Implementation

Figure 5:
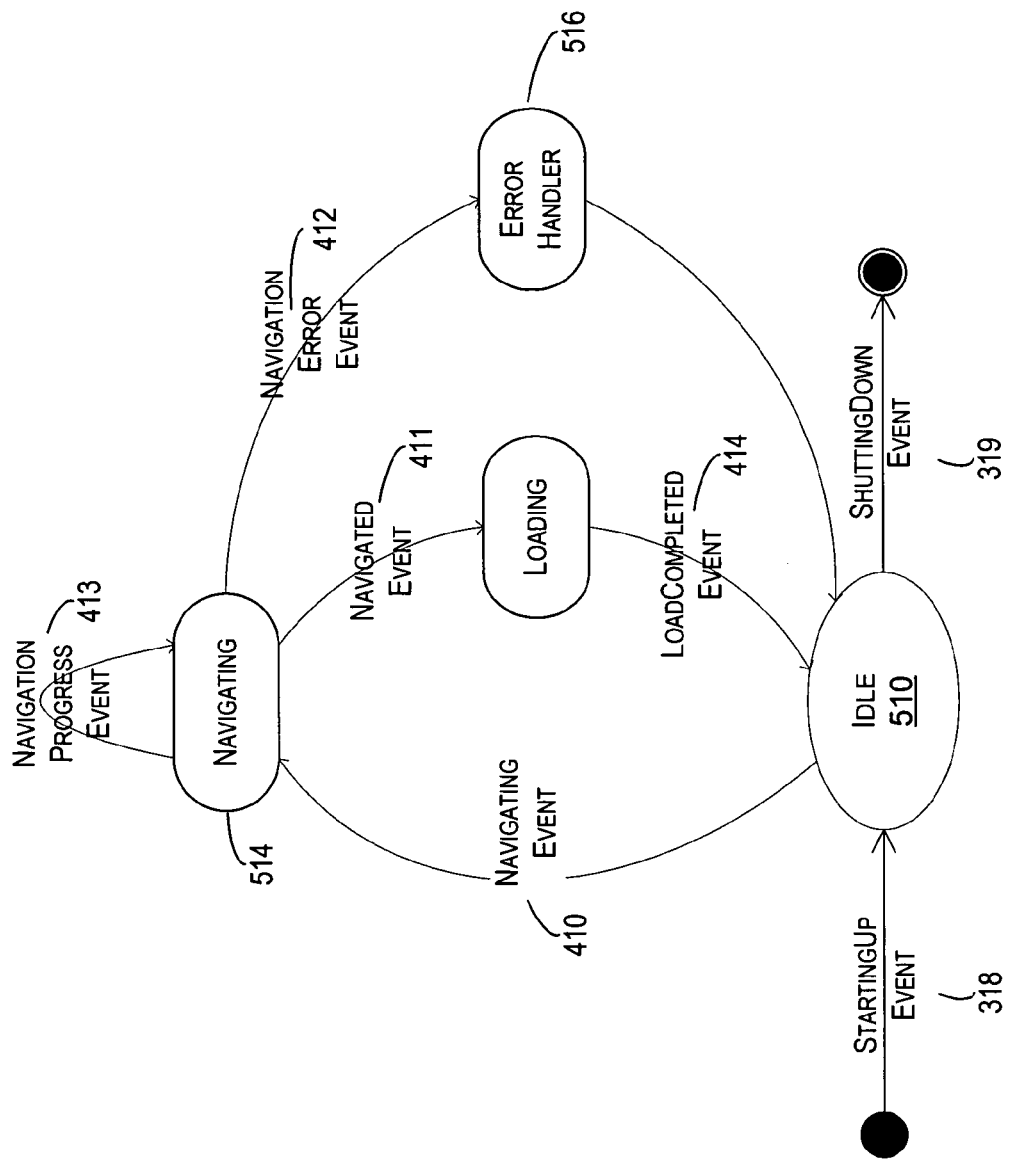
FIG. 5 is a logical state diagram generally illustrating a process for raising navigation events about a navigation-based application, in accordance with one implementation of the invention.

FIG. 5 is a logical state diagram generally illustrating a process for notifying resources of a navigation-based application (e.g., a Web app) of navigation related occurrences, in accordance with one implementation of the invention. Referring to FIG. 5, various stages of operation of a navigation-based application are shown. For the purpose of this discussion, the navigation-based application described has a NavigationApplication object 205 that is accessible from various pages or resources belonging to the application. The NavigationApplication object includes methods and properties to facilitate the persistence of state information. The NavigationApplication object also includes events that, when raised, indicate the occurrence of navigation-related actions, such as navigating from one resource to another, shutting down the app, or starting up the app.

To begin, the app may not yet be executing or it may be executing in an idle condition 510, which, for the purpose of this discussion, means that the app is not currently undergoing a navigation-related activity, starting up, or shutting down. The state diagram of FIG. 5 illustrates certain illustrative events that may cause the state of the app to be persisted.

If the app is not yet executing, a Starting Up event (e.g., StartingUp event 318) is fired when the app is initiated or launched. The Starting Up event indicates that the app is being launched and thus provides an opportunity to apply particular application settings and the like to the app. For example, as described above in conjunction with FIG. 3, the use of the application object as an entry point to the app makes it possible for an application developer to use the StartingUp event 318 to possibly restore state of the application as it was when last it was shut down. In response to the Starting Up event (if not cancelled), the app will typically open a window and perform a navigation to the URI specified by the StartupUri property.

From the idle condition 510, a Shutdown event (e.g., Shutdown event 319) is fired when the executing application is shut down. For example, when the application is closed or in response to navigating outside the scope of the application, the Shut Down event 319 is fired. In response, the app may perform clean-up activities, or perhaps store some state information to permanent or semi-permanent storage.

While in the idle condition 510, a navigating event (e.g., navigating event 410) is fired by the NavigationApplication object in response to a request for the app to move from one resource to another. The navigating event causes the app to move to the navigating condition 514. In one example, a user may have been interacting with a first resource, such as a Web page or the like. The navigation event would be caused by the user attempting to navigate away from the first resource to another resource, such as by activating a hyperlink or the like. The NavigationApplication object receives notice of this occurrence, and fires the navigating event. The navigating event provides the resource being navigated away from with an opportunity (before the navigation actually occurs) to perform any activities necessary before the resource is released from memory.

While the application is in the navigating condition 514, a NavigationProgress event 413 is fired periodically by the NavigationApplication object to notify the developer of the progress of the navigation/download. The NavigationProgress event provides the application with information on how much of the resource being navigated to has been downloaded, and how much remains to be downloaded. The developer can use this to display a progress indicator to the user.

If an error occurs during the navigation, a NavigationError event 412 is raised, which moves the process to an error handler condition 516. Any appropriate action may occur or be performed by the error handler in response to the NavigationError event 412. From the error handler condition 516, the process may return to the idle condition 510.

From the navigating condition 514, a navigated event (e.g., Navigated event 411) is fired by the NavigationApplication object at the successful conclusion of a navigation. The Navigated event 411 indicates that a new resource has been properly navigated to without errors. The Navigated event 411 is informational and may be used to perform initialization actions on the resource navigated to.

As mentioned, the NavigationApplication object includes a Properties collection that may be used by the several resources of the app to store and retrieve state information. At any point during the execution of the application, a resource associated with the application may create additional properties within the Properties collection, and add values to those additional properties. Adding properties to the Properties collection makes that information available to other resources within the scope of the app. In this way, state information could be locally stored and retrieved when a resource is either unloaded or loaded, respectively. This ability enables navigation-based applications to persist state information across navigations without the use of server-side objects or cookies. In addition, the mechanisms described here allow information to be stored in object-form, and not simply in text files. These advantages allow a navigation-based application to be downloaded and executed locally, and provide a better user experience than it would if executed online.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computing device for executing a navigation-based web application at the computing device, the computing device comprising:
    a processor;
    a first set of application programming interfaces, implemented and executed by the computing device, configured to support execution of the navigation-based web application within the software architecture,
    wherein the navigation-based web application comprises:
        multiple web pages expressed in declarative languages and hyperlinked together;
        a plurality of resources distributed to the multiple web pages, the plurality of resources each having state information reflecting its current state; and
        one or more business logic within an extent of the navigation-based web application, the one or more business logic being applied to the multiple web pages and the plurality of resources of the navigation-based web application; and
    wherein the first set of application programming interfaces comprises a ShutDown method that, when called, is operative to cause the state information of each of the plurality of resources to be saved when the navigation-based web application is shut down;
    a second set of application programming interfaces, implemented and executed by the computing device, configured to support navigation-related activities of the navigation-based web application, wherein:
        the navigation-related activities are activities arising from navigation among the multiple pages of the navigation-based web application;
        a navigation-based web application object is created after the navigation-based web application is launched at the computing device, the navigation-based web application object residing in a runtime execution environment of the computing device; and
        the state information of each of the plurality of resources of the navigation-based web application is:
            persisted within the navigation-based web application object;
            made accessible to the plurality of other resources within the navigation-based web application; and modified according to the one or more business logic in response to an occurrence of the navigation-related activities during a session of the navigation-based web application.

2. The computing device recited in claim 1, wherein the first set of application programming interfaces further comprises a StartingUp method that includes executable instructions that are executed to load the state information of each of the plurality of resources of the navigation-based web application when the navigation-based web application is being launched.

3. The computing device recited in claim 1, wherein the first set of application programming interfaces further comprises a Windows collection in which is stored information that identifies one or more windows that are used in connection with the navigation-based web application.

4. The computing device recited in claim 1, wherein the first set of application programming interfaces further comprises a Resources property that specifies the plurality of resources that apply to the multiple pages within an extent of the navigation-based web application.

5. The computing device recited in claim 1, wherein the second set of application programming interfaces comprises a Properties collection in which is stored information about a state of the navigation-based web application during execution.

6. The computing device recited in claim 1, wherein the second set of application programming interfaces comprises a StartUpURI property that specifies the plurality of resources to which the navigation-based web application navigates upon being launched.

7. The computing device recited in claim 6, wherein the plurality of resources comprise an executable resource.

8. The computing device recited in claim 1, wherein the second set of application programming interfaces comprises a set of events related to an occurrence of a navigation by the navigation-based web application.

9. The computing device recited in claim 8, wherein the set of events comprises a Navigating event indicative of an initiation of the navigation.

10. The computing device recited in claim 8, wherein the set of events comprises a Navigated event indicative of completion of the navigation.

11. The computing device recited in claim 8, wherein the set of events comprises a NavigationError event indicative of an occurrence of an error during the navigation.

12. The computing device recited in claim 8, wherein the set of events comprises a NavigationProgress event that is raised periodically during the navigation to enable information about the navigation to be discerned.

13. A computer-readable storage medium having computer-executable components for supporting execution of a navigation-based web application, the components comprising:
an application programming interface exposed by the navigation-based web application, the navigation-based web application comprising:
multiple web pages expressed in declarative languages and hyperlinked together;
a plurality of resources distributed to the multiple web pages, the plurality of resources each having state information reflecting its current state; and
one or more business logic within an extent of the navigation-based web application, the one or more business logic being applied to the multiple web pages and the plurality of resources of the navigation-based web application;
the application programming interface including:
an OnStartingUp method including executable instructions to be executed to load states of the navigation-based web application when it is being launched;
an OnShutDown method including executable instructions that are executed when the navigation-based web application is being shut down; and
a ShutDown method that, when called, is operative to cause the states of the navigation-based web application to be saved before it is shut down,
wherein:
a navigation-based web application object is created after the navigation-based web application is executed at the computing device, the navigation-based web application object:
residing in a runtime execution environment of the computing device; and
state information of each of the plurality of resources of the navigation-based web application is:
persisted in the navigation-based web application object;
made accessible to the plurality of other resources of the navigation-based web application; and
modified according to the one or more business logic during a session of the navigation-based web application.

14. The computer-readable storage medium recited in claim 13, wherein the application programming interface further comprises a Windows collection in which is stored information that identifies one or more windows that are used in connection with the navigation-based web application.

15. The computer-readable storage medium recited in claim 13, wherein the application programming interface further comprises a Resources property that specifies resources that apply to pages within an extent of the navigation-based web application.

16. A computer-readable storage medium having computer-executable components for supporting the execution of a navigation-based web application at a computing device, the components comprising:
an application programming interface exposed by the navigation-based web application, the navigation-based web application comprising:
multiple web pages expressed in declarative languages and hyperlinked together;
a plurality of resources distributed to the multiple web pages, the plurality of resources each having state information reflecting its current state; and
one or more business logic within an extent of the navigation-based web application, the one or more business logic being applied to the multiple web pages and the plurality of resources of the navigation-based web application,
the application programming interface including:
a Properties collection that stores state information of the plurality of resources of the navigation-based web application during execution; and
a StartUpURI property that specifies the resources to which the navigation-based web application navigates upon being launched,
wherein:
a navigation-based web application object is created after the navigation-based web application is launched at the computing device, the navigation-based web application object:
residing in a runtime execution environment of the computing device; and the state information of the resources in the Properties collection of the navigation-based web application is:
  persisted within the navigation-based web application object;
  made accessible to the plurality of other resources within the navigation-based web application; and
  modified according to the one or more business logic during a session of the navigation-based web application.

17. The computer-readable storage medium recited in claim 16, wherein the plurality of resources further comprise an executable resource.

18. The computer-readable storage medium recited in claim 16, wherein the application programming interface further comprises a set of events related to an occurrence of a navigation by the navigation-based web application.

19. The computer-readable storage medium recited in claim 18, wherein the set of events comprises a Navigating event indicative of an initiation of the navigation.

20. The computer-readable storage medium recited in claim 18, wherein the set of events comprises a Navigated event indicative of completion of the navigation.

21. The computer-readable storage medium recited in claim 18, wherein the set of events comprises a Navigation-Error event indicative of an occurrence of an error during the navigation.

22. The computer-readable storage medium recited in claim 18, wherein the set of events comprises a Navigation-Progress event that is raised periodically during the navigation to enable information about the navigation to be discerned.

* * * * *